(No Model.)

G. F. SHAVER.
LINE CONNECTION FOR MECHANICAL TELEPHONES.

No. 352,577. Patented Nov. 16, 1886.

Witnesses.
Thomas Hunt
J. Frank Walters

Inventor.
George F. Shaver
by
C. Wyllys Betts
Attorney

UNITED STATES PATENT OFFICE.

GEORGE F. SHAVER, OF NEW YORK, N. Y.

LINE-CONNECTION FOR MECHANICAL TELEPHONES.

SPECIFICATION forming part of Letters Patent No. 352,577, dated November 16, 1886.

Application filed January 25, 1886. Serial No. 189,618. (No model.)

*To all whom it may concern:*

Be it known that I, GEORGE F. SHAVER, a citizen of the United States, residing at New York, in the county of New York and State of New York, have invented certain new and useful Improvements in Line-Connections for Mechanical Telephones, of which the following is a specification, reference being had therein to the accompanying drawings, in which—

Figure 1:
Figure 2:
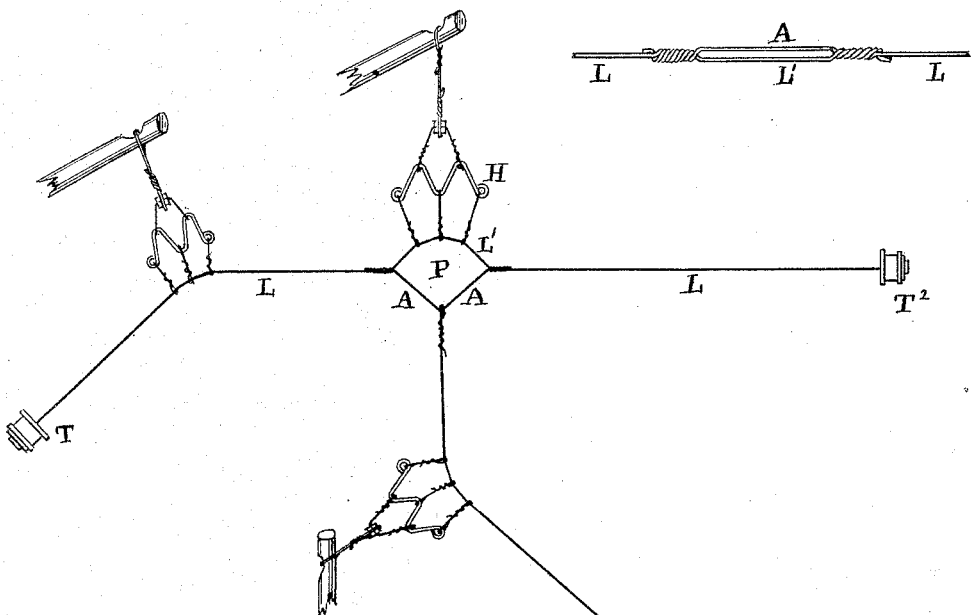
Figure 3:
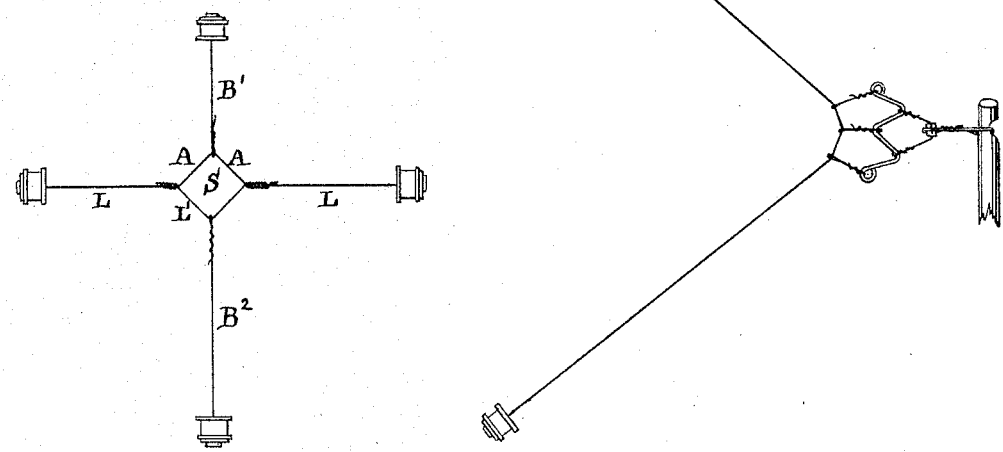

Figure 1 represents a section of line-wire, with the connection for attaching the branch wire. Fig. 2 represents the branch wire attached. Fig. 3 represents two branch wires attached.

Similar letters refer to similar parts throughout the several views.

The object of my invention is to provide means whereby one or more branch wires in mechanical telephones may be connected with the main wire, and all the wires may be kept at the same or substantially the same tension, so that the vibrations conveyed to distant telephones will be of substantially the same strength.

L is the main line.

A is a short supplemental piece of wire connected with the main line at the place where the branch wire is to be attached. It is represented as attached by having its ends coiled upon the main wire, the main wire being twisted with it, so as to prevent it from slipping. When this short supplemental wire is thus securely attached to the main wire, the branch wire B may be attached to it on one side, as shown in Fig. 2, and in that case a hanger, H, should be attached to the main line between the ends of this supplemental piece A, and thus when the tension is given to the branch wire the supplemental wire A and the portion of the main wire L' between the ends of the said supplemental wire will be drawn to the form of a polygon, as shown in Fig. 2, and by this means the tension of the two ends of the main line connected with the telephones T' T² will be substantially equal, and also the tension of the branch B will be the same. When two branch wires are to be attached, one may be attached to the supplemental wire A and the other to the portion of the main line L' lying between the ends of that supplemental wire, as shown in Fig. 3. The proper tension being then given to the two branches B' B², the supplemental wire A and the portion of the main line L' lying between its ends will be drawn into the form of a square, S, as shown in Fig. 3, and thus the tension of all four wires will be substantially the same.

What I claim as my invention, and desire to secure by Letters Patent, is—

1. In a mechanical-telephone line, the combination, with the main line, of one or more branch lines, said branch line or lines being connected to the main line by means of a short supplemental piece of wire attached by its ends to the main line, substantially as described.

2. In a mechanical-telephone line, the combination with the main line, of a short supplemental piece of wire, attached at its ends to the main line to form a loop therewith, and one or more branch lines, said branch line or lines being connected to the side or sides of the loop, the tension of said main and branch line, when properly stretched, causing the loop to assume the form of a polygon, substantially as described.

3. The combination, with the main line and short supplemental piece of wire connected at its ends to the main line to form a loop, of a branch line connected to one side of the loop, and a hanger connected to the other, whereby the loop is maintained in the form of a polygon, substantially as described.

In testimony whereof I affix my signature, in presence of two witnesses, this 23d day of January, 1886.

GEORGE F. SHAVER.

Witnesses:
C. WYLEYS BETTS,
THOMAS HUNT.